United States Patent Office 3,155,630
Patented Nov. 3, 1964

3,155,630
NOVEL POLYMERS FROM THE CONDENSATION OF BIS(AZIDODIARYLPHOSPHINE) DECABORANE AND DIPHOSPHINE
Hansjuergen A. Schroeder, New Haven, Conn., assignor to Olin Mathieson Chemical Corporation, a corporation of Virginia
No Drawing. Filed July 23, 1962, Ser. No. 211,869
17 Claims. (Cl. 260—2)

This invention relates to linear polymers prepared by the reaction of a bis(azidodiarylphosphine) decaborane with a diphosphine. More particularly, this invention relates to linear polymers formed by the condensation at elevated temperatures of an alkylene or arylene diphosphine with a bis(azidodiarylphosphine) decaborane.

The novel linear polymers of this invention contain a multiplicity of structural units of the following formula:

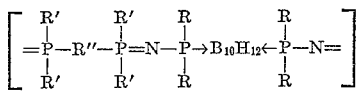

In the above formula R is an aryl radical selected from the group consisting of phenyl, tolyl, xylyl, naphthyl, biphenylyl or alkyl-substituted derivatives thereof, R' is an aryl radical selected from the group consisting of phenyl, tolyl, xylyl, naphthyl and biphenylyl and R'' is an alkylene radical having from 1 to 8 carbon atoms, an arylene radical having not more than 8 carbon atoms or the biphenylene radical.

The novel polymers of this invention are prepared by the condensation of bis(azidodiarylphosphine) decaboranes with diphosphines of the formula:

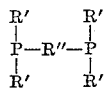

wherein R' and R'' have the same meaning as previously described, in the presence of an inert organic solvent at temperatures ranging from about 50° C. to about 220° C. Generally, about 1 mole of the bis(azidodiarylphosphine) decaborane will be reacted with 1 mole of the diphosphine, however, an excess of the bis(azidodiarylphosphine) decaborane up to about 2 moles per mole of the diphosphine can be employed, if desired. During the course of the reaction nitrogen is evolved. The reaction between the bis(azidodiarylphosphine) decaborane and the diphosphine is usually completed in from about 0.1 to about 20 hours or more with preferred reaction time being from about 1 to about 8 hours. Suitable inert organic solvents include aromatic hydrocarbon solvents, such as benzene, toluene and xylene and other solvents, such as dioxane, acetonitrile, propionitrile, etc. Any organic solvent can be employed in which the reactants are soluble and which is inert with respect to the reactants and the product. The proportion of solvent employed is not critical and may range from about 5 to about 100 parts by weight or more per part of the reactants used. The polymers of this invention, being extremely insoluble in most common organic solvents, precipitate during the course of the reaction and can be recovered from the reaction mixture by a variety of methods well known in the art such as by filtration, decantation etc. The reaction pressure is not critical and pressures varying from sub-atmospheric up to about 10 atmospheres or more can be employed.

The bis(azidodiarylphosphine) decaborane utilized as starting materials in the process of this invention can be prepared as described in Knowles and Schroeder application Serial No. 211,823 for Composition and Method, filed July 23, 1962. For example, bis(azidodiphenylphosphine) decaborane can be prepared by reacting a suspension of sodium azide and bis(chlorodiphenylphosphine) decaborane in ethanol for about 1 hour at 30° C. Other bis(azidodiarylphosphine) decaboranes suitable as starting materials in the process of this invention include bis(azidoditolylphosphine) decaborane, bis(azidodixylylphosphine) decaborane, bis(azidodinaphthylphosphine) decaborane, bis(azidodibiphenlyphosphine) decaborane etc. Diphosphines useful in this invention include, for example, 1,2-bis(diphenylphosphino) ethane, 1,2-bis(ditolylphosphino) ethane, 1,2-bis(dibiphenylphosphino) ethane, 1,2-bis(diphenylphosphino) isopropane, 1,3-bis(diphenylphosphino) propane, 1,4-bis(diphenylphosphino) butane, 1,3-bis(dixylylphosphino) propane and 1,3-bis(diphenylphosphino) pentane. Other useful diphosphines include, 1,4-bis(diphenylphosphino) benzene, 1,4-bis(diphenylphosphino) toluene, 1,4-bis(diphenylphosphino) xylene, 1,4-bis(ditolylphosphino) benzene, 1,4-bis(dixylylphosphino) benzene, 1,4-bis(dixylylphospino)toluene, 1,4 - bis(dinaphthylphosphino) benzene, 1,4-bis(dinaphthylphosphino) xylene, 1,4-bis )dibiphenylphosphino) benzene, 1,3-bis(dibiphenyl phosphino) toluene, 1,3-bis(diphenylphosphino) benzene, p-bis(diphenylphosphino) biphenyl, etc.

The polymers of this invention are hydrolytically stable, possess excellent solvent resistance and, in addition, they have high softening points. When compounded with inert mineral fillers, such as asbestos, they can be pressure molded to form gaskets, or bushings which are suitable for use in high pressure and high temperature applications. The physical appearance of such products does not change when they are heated to temperatures in excess of 750° F. In addition, these compositions are distinguished by their hardness and sharpness of contour and they also exhibit very little resilience.

EXAMPLE I

*Reaction of Bis(Azidodiphenylphosphine) Decaborane With 1,2-Bis(Diphenylphosphino) Ethane in Benzene*

Benzene solutions of bis(azidodiphenylphosphine) decaborane (1.15 g., 0.002 mole) and 1,2-bis(diphenylphosphino) ethane (0.8 g., 0.002 mole) were mixed and refluxed for 5 hours in a nitrogen atmosphere. The hot reaction mixture was filtered and the filter residue was extracted with acetonitrile (30 mole) under reflux to remove all soluble material. The remaining material was dried in vacuo and the yield of polymeric product was 1.2 g. which softened at about 225° C. and which was soluble in hot dimethylformamide. Analysis of the polymeric product indicated that the product was composed essentially of units corresponding to the following formula:

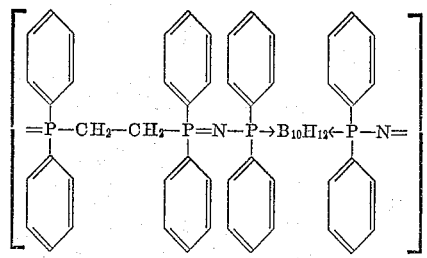

Calc'd for $C_{50}H_{56}B_{10}N_2P_4$: C, 65.48; H, 6.16; B, 11.80; N, 3.06; P, 13.51. Found: C, 64.94; H, 6.62; B, 10.30; N, 3.31; P, 12.90.

EXAMPLE II

*Reaction of Bis(Azidodiphenylphosphine) Decaborane With 1,2-Bis(Diphenylphosphino) Ethane in Dioxane*

Equimolar quantities of bis(azidodiphenylphosphine)

decaborane (4 g., 0.007 mole) and 1,2-bis(diphenylphosphino) ethane (2.8 g., 0.007 mole) were refluxed in dioxane (100 ml.) and under nitrogen for 5 hours. A semi-solid product precipitated which was recovered by decanting the hot solvent. After drying in vacuo the material thus obtained was triturated with hot acetonitrile filtered and dried in vacuo again to give 3.8 g. of polymeric product which was found to have a softening point very similar to the product of Example I and, in addition, the infrared spectrum was identical with that of product of Example I indicating that the same polymeric product had been prepared.

EXAMPLE III

*Reaction of Bis(Azidodiphenylphosphine) Decaborane With 1,4-Bis(Diphenylphosphino) Benzene in Benzene*

A solution of bis(azidodiphenylphosphine) decaborane (5.74 g., 0.01 mole) and 1,4-bis(diphenylphosphino) benzene (4.46 g., 0.01 mole) in benzene (75 ml.) was refluxed for 5 hours in a nitrogen atmosphere. The hot reaction mixture was filtered to give 5.8 g. of polymeric reaction product, M.P.>300° C.; extraction with hot acetonitrile did not decrease the yield. The polymeric product softened slightly at about 350° C. but did not melt>400° C. Analysis of the polymeric product indicated that the product was composed essentially of units corresponding to the formula:

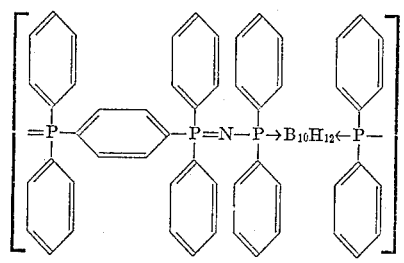

Calc'd for $C_{54}H_{56}B_{10}N_2P_4$: C, 67.20; H, 5.85; B, 11.21; N, 2.90; P, 12.84. Found: C, 66.70; H, 5.96; B, 11.78; N, 3.08; P, 12.10.

EXAMPLE IV

*Reaction of Bis(Azidodiphenylphosphine) Decaborane With 1,4-Bis(Diphenylphosphino)Benzene in Acetonitrile*

Equimolar amounts of bis(azidodiphenylphosphine) decaborane (1.12 g., 0.002 mole) and 1,4-bis(diphenylphosphino) benzene (0.89 g., 0.002 mole) were refluxed in acetonitrile (100 ml.) in a nitrogen atmosphere. Polymeric product started to precipitate after 15 minutes and was recovered by filtration after a 5 hour reflux period. Yield of polymeric product was 1.2 g. The infrared spectrum of the product was found to be the same as that of the product of Example III indicating that the same polymeric product had been formed. The softening point of the product was measured and also found to be very similar to that of the product of Example III.

EXAMPLE V 0.5 g. of polymeric product of the type produced in Example III and 1.5 g. of asbestos fibre were dry blended and charged to a mold consisting of a steel block (½ in. diameter cavity) and two steel plugs. The top surfaces of the steel plugs were covered with aluminum discs to avoid contact with the resin mixture. A pressure of 500 lbs./sq. in. was applied and maintained by means of a C clamp. The mold was put in a heating oven at 800° F. for 30 minutes, then taken apart at approximately 500° F. and the disc removed. The resulting hard disc possessed sharp contours and exhibited very little resilience. After heating this disc to 1000° F. and maintaining it at that temperature for 30 minutes, no physical change was detected.

EXAMPLE VI 0.5 g. of polymeric product of the type prepared in Example I, 0.5 g. of asbestos fibre, and 0.5 g. of technical grade dimethylformamide were mixed to form a dough which was charged to the mold described in detail in Example V. A pressure of 500 lbs./sq. in. was applied and maintained with a C clamp. The mold was heated at 700° F. for 30 minutes, then taken apart at approximately 500° F. and the disc removed. After heating this disc to 750° F. for 30 minutes, the physical appearance had not changed thus demonstrating the high temperature stability of the product.

What is claimed is:

1. A novel linear polymeric composition consisting essentially of recurring structural units of the formula:

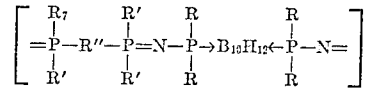

wherein R and R' are each selected from the group consisting of phenyl, tolyl, xylyl, naphthyl, and biphenylyl, and R'' is selected from the group consisting of alkylene having from 1 to 8 carbon atoms, arylene having not more than 8 carbon atoms and biphenylene.

2. The polymeric composition of claim 1 wherein R is phenyl, R' is phenyl, and R'' is —$CH_2$—$CH_2$—.

3. The polymeric composition of claim 1 wherein R, R' and R'' are each phenyl.

4. A process for the preparation of linear polymeric products which comprises reacting a compound of the formula:

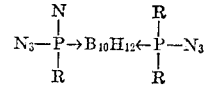

wherein R is a radical selected from the group consisting of phenyl, tolyl, xylyl, naphthyl and biphenylyl, with a diphosphine of the formula:

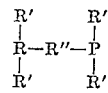

wherein R' is a radical selected from the group consisting of phenyl, tolyl, xylyl, naphthyl and biphenylyl and R'' is a radical selected from the group consisting of alkylene having from 1 to 8 carbon atoms, arylene having not more than 8 carbon atoms and biphenylene in the presence of an inert organic solvent.

5. The process of claim 4 wherein the reaction is carried out at a temperature of from about 50° C. to about 220° C.

6. The process of claim 4 wherein the said compound is:

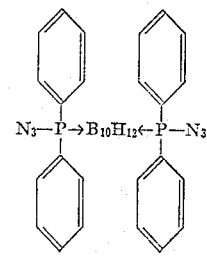

7. The process of claim 4 wherein the said diphosphine is 1,2-bis(diphenylphosphino) ethane.

8. The process of claim 4 wherein the said diphosphine is 1,4-bis(diphenylphosphino) benzene.

9. The process of claim 4 wherein the said inert organic solvent is benzene.

10. The process of claim 4 wherein the said inert organic solvent is dioxane.

11. The process of claim 4 wherein the said inert organic solvent is acetonitrile.

12. The process for the preparation of a linear polymeric product which comprises reacting the compound:

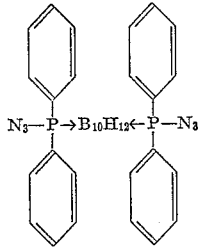

with 1,2-bis(diphenylphosphino) ethane at a temperature of from about 50° C. to about 220° C. and in the presence of an inert organic solvent.

13. The process of claim 12 in which the inert organic solvent is benzene.

14. The process of claim 12 in which the inert organic solvent is dioxane.

15. The process for the preparation of a linear polymeric product which comprises reacting the compound.

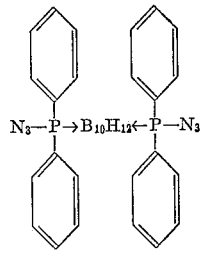

with 1,4-bis(diphenylphosphino) benzene at a temperature of from about 50° C. to about 220° C. and in the presence of an inert organic solvent.

16. The process of claim 15 in which the said inert organic solvent is benzene.

17. The process of claim 15 in which the said inert organic solvent is acetonitrile.

References Cited in the file of this patent

UNITED STATES PATENTS

| | | |
|---|---|---|
| 3,035,949 | Parshall | May 22, 1962 |
| 3,064,055 | Herring | Nov. 13, 1962 |

UNITED STATES PATENT OFFICE
CERTIFICATE OF CORRECTION

Patent No. 3,155,630                      November 3, 1964

Hansjuergen A. Schroeder

It is hereby certified that error appears in the above numbered patent requiring correction and that the said Letters Patent should read as corrected below.

Column 2, line 49, for "225° C." read -- 255° C. --; column 3, lines 30 to 40, the formula should appear as shown below instead of as in the patent:

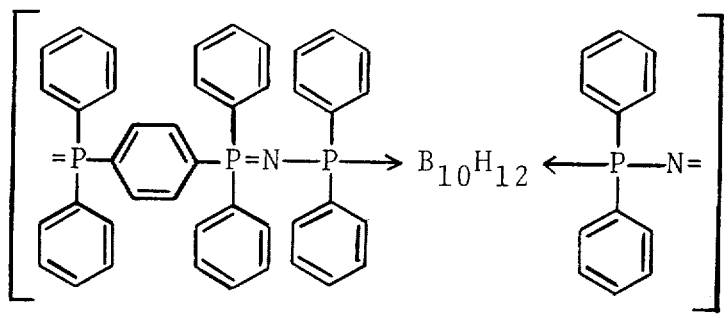

column 4, lines 19 to 22, upper left-hand portion, for "$R_7$" read -- $R'$ --; same column 4, lines 35 to 39, the formula should appear as shown below instead as in the patent:

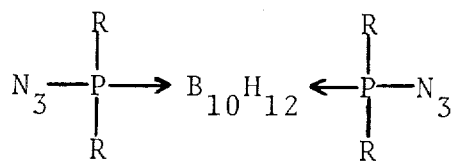

3,155,630 same column 4, lines 43 to 47, the formula should appear as shown below instead of as in the patent:

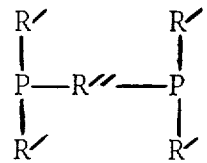

Signed and sealed this 29th day of June 1965.

(SEAL)
Attest:

ERNEST W. SWIDER
Attesting Officer

EDWARD J. BRENNER
Commissioner of Patents